July 4, 1950     G. H. VON DEYLEN     2,513,385
CONVERSION EQUIPMENT IN INTERNAL-COMBUSTION
MOTOR IGNITION PRACTICE
Filed March 15, 1948
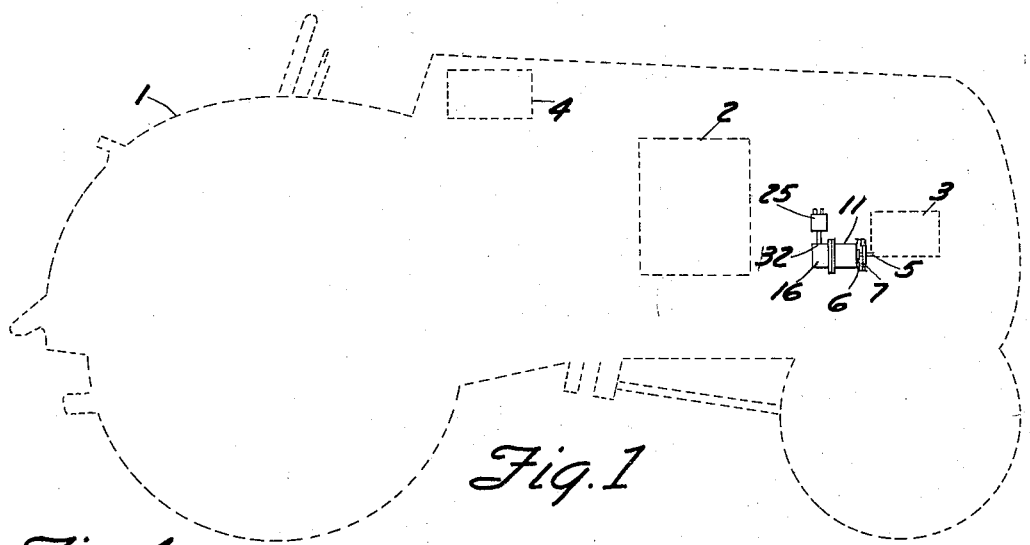
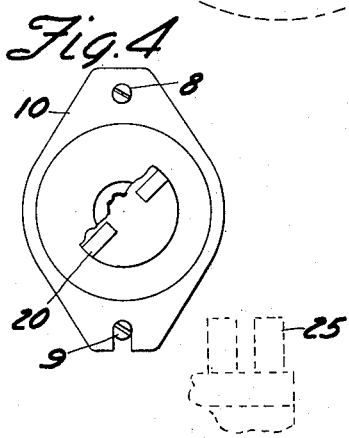
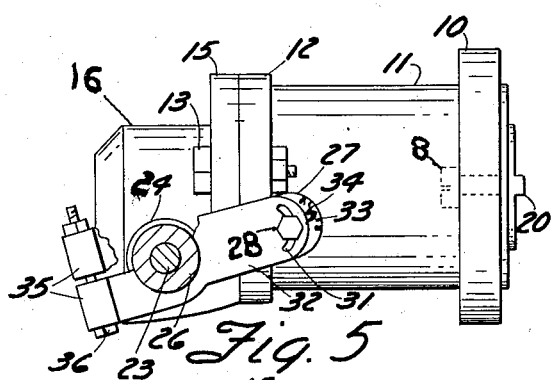
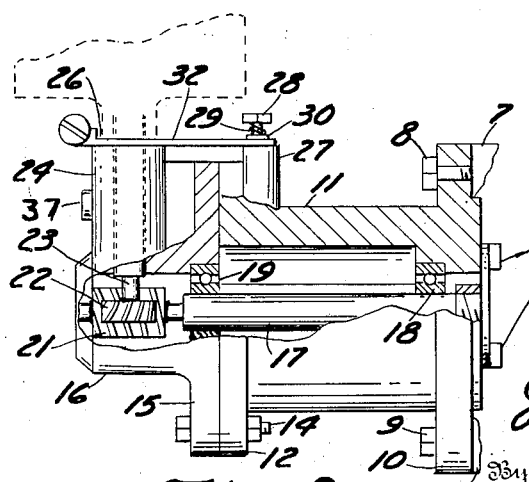
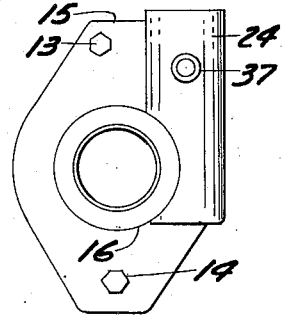

Patented July 4, 1950

2,513,385

UNITED STATES PATENT OFFICE 2,513,385

CONVERSION EQUIPMENT IN INTERNAL-COMBUSTION MOTOR IGNITION PRACTICE

George H. Von Deylen, Napoleon, Ohio

Application March 15, 1948, Serial No. 15,035

3 Claims. (Cl. 74—400)

This invention relates to motor vehicle practice, and has to do with adapting for change over in the type of ignition for the internal combustion motor from magneto to generator and battery type by introducing a substitutive transmission unit for a distributor head.

This invention has utility, more particularly, in tractor type of equipment, by substituting, for normal equipment installation high tension induction type of magneto, a housing for a shaft section to take drive therefor from the drive for the magneto, the housing providing a mounting for a distributor head in transmission relation from the shaft section. Thereby there is simply provided spark plug timing control properly synchronized with the motor and with the energy from a generator or battery thru proper coil means to the head and from the head to the spark plugs in the several cylinders of the motor.

Referring to the drawings:

Fig. 1 is a showing in dotted outline of type of tractor currently largely in agricultural or farm use, there being in full line showing, a side elevation of the distributor head and the housing support therefor having the drive thereto;

Fig. 2 is a similar side elevation for the housing, but on a larger scale than in Fig. 1, and with dotted line fragmentary showing for the distributor head;

Fig. 3 is an end elevation of the housing from the left of Fig. 2;

Fig. 4 is an elevational view of the opposite end of the housing from that in Fig. 3, being from the right of Fig. 2; and Fig. 5 is a plan view, with portions broken away, of the two-part housing for the unit, having a major fragment of an adjustment device or control for the distributor head body as to the transmission thereto, thus to vary the timing.

Tractor 1, equipped with an internal combustion motor 2, generator 3 driven by said motor, and a storage battery 4, in its equipment production has a magneto drive shaft 5 actuated from the motor 2. The shaft 5 has a jaw coupling 6. A housing 7 for the shaft 5 has extending therefrom bolts 8, 9, normally adapted to mount a magneto.

Under the invention herein, the bolts 8, 9, assemble a flange 10 with the housing 7. From the flange 10, there extends a cylindrical housing section 11 to a flange 12, where bolts 13, 14, assemble flange 15 of a secondary housing section 16 with the primary housing section 10, 11, 12.

A shaft section 17 thru the primary housing section 10, 11, 12, is mounted in an anti-friction bearing 18 in the section 10, 11, 12, and a similar bearing 19 in the section 15, 16. The shaft 17 on its end thru the bearing 18 carries a complementary jaw coupling 20 to the coupling 6 on the shaft 5, thereby maintaining a one-to-one driven speed from the shaft 5. The opposite end of the shaft 17 in the housing section 15, 16, has a worm gear 21 thereon in mesh with a worm wheel 22 on a vertical shaft 23, extending upward thru a boss 24 on the housing 15, 16, to a distributor head 25. Fixed with the head 25 is a sleeve 26 about the shaft 23.

The primary housing section 10, 11, 12, has a minor boss 27, terminally in a common plane with the top of the boss 24. A set screw 28 with a spring washer 29 and a flat washer 30 is thru an arc opening 31 in a control arm 32, to engage in the boss 27. Graduations 33 on the top of the boss 27 are in a range to coact with a pointer 34 on the arm 32. The arm 32 extends to have a forked free end 35 adapted to be adjusted as a clamp by a bolt 36 to grip the sleeve 26. With this grip set to holding relation by the bolt 36, the arc slot 31 on a radius from the axis of the boss 27, allows the arm 32, when the screw 28 is loosened, to be shifted to advance or retard the spark in coaction with the graduations 33. With the desired setting obtained, the screw 28 is tightened to lock the control arm 32 as so set.

At the boss 24 there may be a pressure lubrication fitting 37.

The fact, that the general practice with tractors, even for agricultural purposes, is to have such equipped with headlights, means that to maintain the lights functioning even with the vehicle or motor stopped, calls for a storage battery. Of course, in this set-up for the lights, there is a generator. General road types of motor vehicles involve in their equipment for the gas engine type of motor, usually an ignition system working from coil means from the generator or battery. In lieu of a magneto, there is the currently much more widely adopted distributor head for running off the battery or generator. For this distributor head type of control, replacement parts are readily available generally at garages and repair places for motor vehicle upkeep. From the foregoing, it is to be seen that there arises practical advantages in discarding the magneto type of equipment. Especially as there may be trouble therewith.

The change-over or conversion, under the invention herein, takes advantage of the mounting for the magneto and the drive thereto. The bolts 8, 9, which mount the magneto, are hereunder taken to provide the mounting for the housing under the invention, and thru which housing there is transmission connection to use the drive for the magneto to run a distributor head carried by the housing. In order to make possible a range for rendering the substitution of the distributor head drive for a magneto, the compact dimensional relation, say in the range of 3½" length for the primary housing section, and somewhat less than 2½" for the extension therebeyond for the secondary housing section, the installation field thereby made available approaches universal. The installation mounting connection is simply made. Notwithstanding the groupings of the many accessories, the type as herein disclosed has been found to have operation clearance in practice.

What is claimed and it is desired to secure by Letters Patent is:

1. For mounting at a main housing having a shaft jaw coupling, a cylindrical housing, means for directly connecting the cylindrical housing axially upon and to be there supported by the main housing, a shaft section having bearing in and adapted to protrude from centrally of the cylindrical housing, one end of the shaft section having complementary jaw coupling connection with the main housing shaft jaw coupling, an angle housing mounted on the other end of the cylindrical housing and about the there-protruding end of the shaft section, a distributor head having a depending sleeve angularly adjustably mounted on the angle housing, a shaft in the sleeve extending into the head, and a transmission connection from the shaft section thru the angle housing for the shaft extending into the head.

2. Conversion equipment comprising a terminally flanged cylindrical housing, bearing means in the housing, a shaft in the bearing and having adjacent one flanged end of the cylindrical housing a shaft coupling portion, a complementally flanged angle housing mounted at the other flanged end of the cylindrical housing, a driven shaft, a sleeve about the driven shaft, a clamp between the housing and sleeve fixing the angular position of the sleeve relatively to the angle housing and transmission from the shaft in the angle housing to the driven shaft.

3. Conversion equipment comprising a flanged end first housing, an angle housing mounted on one flanged end of the first housing, a first shaft in the first housing, a second shaft, a sleeve about the second shaft providing a bearing for the second shaft, a clamp for the sleeve provided with an arm extending radially therefrom, manually adjustable locking means between the arm and one of the housings for varying the angular setting of the sleeve, a transmission connection between the shafts in the angle housing, and mounting means for the assembled housing at the first housing flanged end remote from the angle housing.

GEO. H. VON DEYLEN.

REFERENCES CITED

The following references are of record in the file of this patent:

UNITED STATES PATENTS

| Number | Name | Date |
| --- | --- | --- |
| 1,327,504 | Wagner | Jan. 6, 1920 |
| 1,395,590 | Moses | Nov. 1, 1921 |
| 1,514,887 | Brandt | Nov. 11, 1924 |
| 1,815,161 | Owens | July 21, 1931 |
| 1,879,004 | Altorfer | Sept. 27, 1932 |

OTHER REFERENCES

Installation Instruction Sheet for "Bosch De Luxe Ignition Systems for Fords;" Type FI-513, Form No. 112A, 1924.